United States Patent
Tanigawa et al.

(10) Patent No.: US 10,355,323 B2
(45) Date of Patent: Jul. 16, 2019

(54) TEMPERATURE DETECTING APPARATUS

(71) Applicant: Yazaki Corporation, Minato-ku, Tokyo (JP)

(72) Inventors: Junya Tanigawa, Susono (JP); Takahiro Shoda, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 362 days.

(21) Appl. No.: 15/450,090

(22) Filed: Mar. 6, 2017

(65) Prior Publication Data
US 2017/0179550 A1 Jun. 22, 2017

Related U.S. Application Data

(63) Continuation of application No. PCT/JP2015/073233, filed on Aug. 19, 2015.

(30) Foreign Application Priority Data

Sep. 10, 2014 (JP) ................. 2014-184074

(51) Int. Cl.
*H01M 10/48* (2006.01)
*G01K 7/24* (2006.01)
*H02J 7/00* (2006.01)

(52) U.S. Cl.
CPC ............ *H01M 10/486* (2013.01); *G01K 7/24* (2013.01); *H02J 7/0008* (2013.01); *H02J 7/0091* (2013.01)

(58) Field of Classification Search
CPC ... G01R 31/385; G01R 31/379; H02J 7/0047; H02J 7/047; H02J 7/0008; H02J 7/0091;
(Continued)

(56) References Cited

U.S. PATENT DOCUMENTS 2,442,380 A * 6/1948 Schrodt ............... H01M 10/615
219/200
5,945,803 A 8/1999 Brotto et al.
(Continued)

FOREIGN PATENT DOCUMENTS

CN 1238462 A 12/1999
CN 102859823 A 1/2013
(Continued)

OTHER PUBLICATIONS

Sep. 6, 2018—(CN) The First Office Action—App 201580048947.2.
(Continued)

*Primary Examiner* — Gail Kaplan Verbitsky
(74) *Attorney, Agent, or Firm* — Banner & Witcoff, Ltd.

(57) ABSTRACT

A temperature detecting apparatus which detects a temperature of an assembled battery in which a plurality of cells are assembled, the temperature detecting apparatus includes a plurality of detecting circuits which respectively correspond to the plurality of the cells, a pair of detection lines which electrically connects the plurality of the detecting circuits in parallel, and a processing part which outputs a sine-wave detection signal to the pair of the detection lines through a voltage-dividing resistor so as to detect a temperature of each of the plurality of the cells. Each of the plurality of the detecting circuits includes a circuit in which a temperature-sensitive resistor whose electrical characteristic changes responding to a temperature, a coil and a capacitor are connected in series.

7 Claims, 3 Drawing Sheets

(58) Field of Classification Search
CPC .......... H02J 7/045; H02J 50/12; H02J 7/0021; G01K 1/14; G01K 7/24; G01K 13/00; G01K 7/00; G01K 7/16; H01M 10/48; H01M 10/482; H01M 2200/10; H01M 2/348
USPC .............. 374/144, 163, 183, 184, 185, 152; 320/104, 150; 702/63, 57
See application file for complete search history.

(56) References Cited

U.S. PATENT DOCUMENTS

| | | | | |
|---|---|---|---|---|
| 8,702,303 | B2* | 4/2014 | Farago | G01K 1/026 |
| | | | | 374/141 |
| 8,704,483 | B2* | 4/2014 | Bertness | G06Q 99/00 |
| | | | | 320/104 |
| 9,186,787 | B2 | 11/2015 | Noda et al. | |
| 9,201,119 | B2* | 12/2015 | Baruzzi | G06F 15/00 |
| 9,568,374 | B2* | 2/2017 | Farago | G01K 1/026 |
| 9,869,724 | B2* | 1/2018 | Kimura | G01R 31/3835 |
| 10,060,329 | B2* | 8/2018 | Murata | F01P 7/12 |
| 2007/0090844 | A1* | 4/2007 | Klang | G01R 31/3648 |
| | | | | 324/426 |
| 2012/0268060 | A1* | 10/2012 | Chen | H02J 7/04 |
| | | | | 320/107 |
| 2013/0027828 | A1 | 1/2013 | Noda et al. | |
| 2013/0069662 | A1* | 3/2013 | Tanabe | H01M 10/482 |
| | | | | 324/434 |
| 2013/0108904 | A1 | 5/2013 | Okabayashi | |
| 2018/0010919 | A1* | 1/2018 | Huang | B60L 58/12 |
| 2018/0248167 | A1* | 8/2018 | Hashizawa | H01M 10/425 |
| 2018/0375178 | A1* | 12/2018 | Yamauchi | G01K 7/22 |

FOREIGN PATENT DOCUMENTS

| | | |
|---|---|---|
| CN | 103090983 A | 5/2013 |
| CN | 203339809 U | 12/2013 |
| JP | 2010-122088 A | 6/2010 |
| JP | 2011-222133 A | 11/2011 |
| WO | 2013-178324 A2 | 12/2013 |

OTHER PUBLICATIONS

Sep. 15, 2015—International Search Report—Intl App PCT/JP2015/073233.

Sep. 15, 2015—(WO) Written Opinion—App PCT/JP2015/073233.

* cited by examiner

FIG. 3

|  | S1 | S2 | S3 | S4 | S5 | S6 |
|---|---|---|---|---|---|---|
| L[uH] | 47 | | | | | |
| C[μF] | 0.1 | 0.15 | 0.22 | 0.33 | 0.47 | 0.56 |
| f0 [kHz] | 73.4 | 59.9 | 49.5 | 40.4 | 33.9 | 31.0 |

TEMPERATURE DETECTING APPARATUS

CROSS REFERENCE TO RELATED APPLICATIONS

This application is a continuation of PCT application No. PCT/JP2015/073233, which was filed on Aug. 19, 2015 based on Japanese Patent Application (No. 2014-184074) filed on Sep. 10, 2014, the contents of which are incorporated herein by reference.

BACKGROUND OF THE INVENTION

Field of the Invention

The present invention relates to a temperature detecting apparatus used for managing a state of an assembled battery (battery pack) formed by assembling a plurality of cells.

Description of Related Art

Conventionally, running vehicles, such as an electric vehicle (EV) and a hybrid vehicle (HEV), using an electric motor (motor) as a driving source are known. This kind of vehicle is equipped with a battery (electric storage device) for supplying electric power to the motor. As the battery, for example, a lithium ion cell is used. In a charging and discharging process of the battery (particularly, when charging is continued in a full charging state, and when a large current continues to flow according to a continuous high load state), the battery generates heat and a temperature of the battery is increased. When the temperature of the battery is increased, output characteristics of the battery can change, with the result that it is preferable to charge and discharge the battery after consideration of the temperature of the battery.

On the other hand, since the battery for driving the motor of the vehicle requires a high output voltage, an assembled battery (battery pack) formed by assembling a plurality of cells (unit cells) is generally used. In this assembled battery, the inside of the assembled battery may have a temperature distribution resulting from the fact that the extent of heat dissipation varies every cell, with the result that it is desirable to manage a temperature every cell.

For example, one conventional temperature detecting apparatus (hereinafter called a "conventional apparatus") is configured to detect a temperature of an assembled battery (battery pack) using a plurality of temperature sensors. Concretely, in the conventional apparatus, the plurality of temperature sensors (with the number smaller than the number of cells) are arranged along an arrangement direction of the cells in the assembled battery. As one example, three temperature sensors are arranged for 100 or more cells in the conventional apparatus. And, the conventional apparatus is configured to estimate the temperature of the inside of the assembled battery based on output values of the temperature sensors and other parameters (for example, an ambient temperature or a cooling air volume). In addition, as the temperature sensor, a temperature-sensitive element such as a thermistor is used (for example, see Patent Document 1: JP-A-2011-222133).

[Patent Document 1] JP-A-2011-222133

According to a related art, an apparatus estimates a temperature of an assembled battery by temperature sensors with the number smaller than the number of cells. As a result, there are cases where the conventional apparatus cannot grasp a temperature state of the inside of the assembled battery with high resolution when the number of temperature sensors is insufficient with respect to the number of cells. Further, since the conventional apparatus is provided with a pair of detection lines (wiring connected to the temperature sensors) for each of the temperature sensors, when the number of temperature sensors is increased in order to increase resolution of temperature detection, the number of detection lines is also increased in proportion to the number of temperature sensors. As a result, many detection lines are cabled in limited space of the inside of a case in which the assembled battery is stored, and cabling work of the detection lines may become complicated. Thus, the conventional apparatus has an antinomy relation between an improvement in the resolution of temperature detection and workability of the cabling of the detection lines.

SUMMARY

One or more embodiments provide a temperature detecting apparatus with good cabling workability of a detection line while detecting a temperature state of an assembled battery with high resolution.

Means for Solving the Problems

In accordance with one or more embodiments, a temperature detecting apparatus according to the invention has features of the following (1) to (6).

(1) A temperature detecting apparatus which detects a temperature of an assembled battery in which a plurality of cells are assembled, the temperature detecting apparatus comprising:

a plurality of detecting circuits which respectively correspond to the plurality of cells, a pair of detection lines which electrically connects the plurality of the detecting circuits in parallel, and a processing part which outputs a sine-wave detection signal to the pair of the detection lines through a voltage-dividing resistor so as to detect a temperature of each of the plurality of the cells, wherein each of the plurality of the detecting circuits includes a circuit in which a temperature-sensitive resistor whose electrical characteristic changes responding to a temperature, a coil and a capacitor are connected in series.

(2) The temperature detecting apparatus according to the above (1), wherein an inductance of the coil and a capacitance of the capacitor in each of the plurality of the detecting circuits are set so that a resonance frequency of each of the plurality of the detecting circuits is a different value from each other, and wherein the processing part outputs the sine-wave detection signal to the pair of the detection lines on varying a frequency of the sine-wave detection signal so as to correspond to the resonance frequency of each of the plurality of the detecting circuits.

(3) The temperature detecting apparatus according to the above (2), wherein the processing part calculates a resistance value of the temperature-sensitive resistor in each of the detecting circuits in which the frequency of the sine-wave detection signal corresponds to the resonance frequency, based on a voltage applied to the voltage-dividing resistor, and wherein the processing part detects the temperature of each of the plurality of the cells provided with the plurality of the detecting circuits, based on the resistance value of the temperature-sensitive resistor.

(4) The temperature detecting apparatus according to the above (1) or (2), wherein the temperature-sensitive resistor is a thermistor.

(5) The temperature detecting apparatus according to the above (2), wherein in each of the plurality of the detecting circuits, the inductance of the coil is set to be a common value and the capacitance of the capacitor is set to be a different value so that the resonance frequency of each of the plurality of the detecting circuits is a different value from each other.

(6) The temperature detecting apparatus according to the above (2), wherein in each of the plurality of the detecting circuits, the capacitance of the capacitor is set to be a common value and the inductance of the coil is set to be a different value so that a resonance frequency of each of the plurality of the detecting circuits is a different value from each other.

According to the invention, the plurality of the detecting circuits are formed so as to correspond to the cells targeted for temperature detection (that is, the detecting circuits correspond to the cells in a one-to-one relation), with the result that a temperature state of each of the cells can be detected. Further, since all the detecting circuits share the pair of (two) detection lines, it is unnecessary to form the detection lines every detecting circuit. Accordingly, the temperature detecting apparatus with good cabling workability of the detection lines while detecting the temperature state of the assembled battery with high resolution can be provided.

The invention has briefly been described above. Further, the details of the invention will become more apparent by reading through a mode (hereinafter called an "embodiment") for carrying out the invention described below with reference to the accompanying drawings.

BRIEF DESCRIPTION OF THE DRAWINGS

FIG. 3 is a diagram showing one example of an inductance, a capacitance and a resonance frequency for each detecting circuit in the temperature detecting apparatus according to the embodiment of the invention.

DETAILED DESCRIPTION

Figure 1:
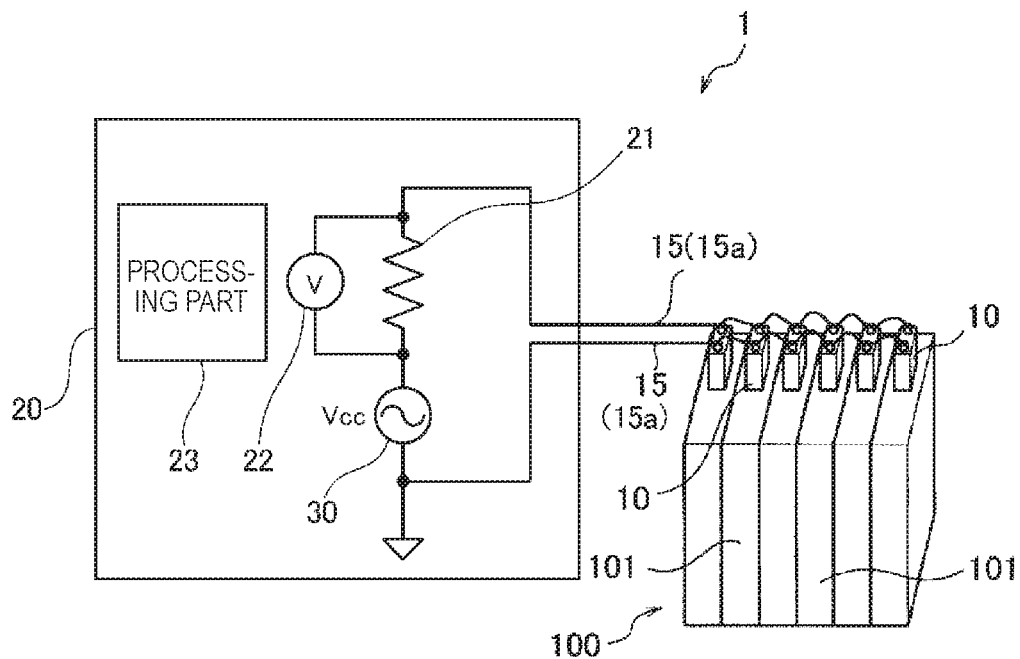
FIG. 1 is an explanatory diagram schematically showing a configuration of a temperature detecting apparatus according to an embodiment of the invention.
Figure 2:
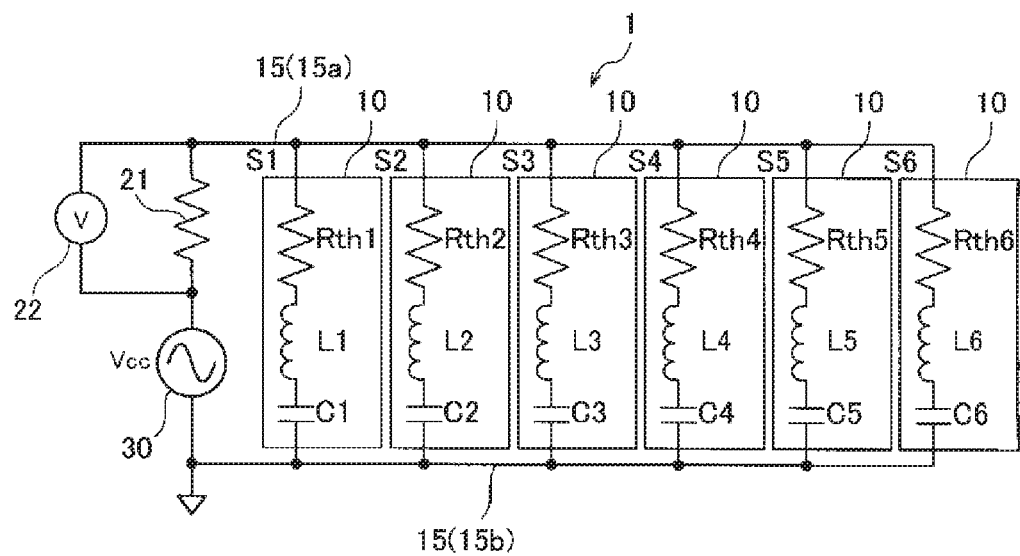
FIG. 2 is an explanatory diagram showing a circuit configuration of the temperature detecting apparatus according to the embodiment of the invention.

As shown in FIGS. 1 and 2, a temperature detecting apparatus (hereinafter called a "temperature detecting apparatus 1") according to an embodiment of the invention is used for managing a state of an assembled battery 100.

The assembled battery 100 is formed by electrically connecting the plurality of cells 101. In the present embodiment, the assembled battery 100 includes six cells 101. The plurality of cells 101 are stored in a module case (not shown) in a state laminated in a thickness direction of the cells 101.

In addition, each of the plurality of cells 101 is constructed of one cell element or by electrically connecting a plurality of cell elements. As the cell 101, for example, a lithium ion cell can be used. Since the lithium ion cell generally has a big characteristic change under high temperature, it is desirable to manage a temperature as strictly as possible.

The temperature detecting apparatus 1 has the plurality of the detecting circuits 10 respectively formed so as to correspond to the plurality of cells 101, a pair of detection lines 15 for electrically connecting the plurality of the detecting circuits in parallel, and a detecting processor 20 for inputting a signal for temperature detection to the detection lines 15 and also detecting a temperature of the cell 101 based on an output from the detection lines.

Each of the plurality of the detecting circuits 10 is an independent circuit. The embodiment is constructed so as to form the six detecting circuits 10 respectively corresponding to the six cells 101 and have a one-to-one relation between each of the detecting circuits 10 and each of the cells 101. In addition, in FIG. 2, numerals from "S1" to "S6" are respectively assigned to the detecting circuits 10 for the purpose of identifying the plurality of the detecting circuits 10.

Each of the detecting circuits 10 is a circuit for detecting a temperature of the corresponding cell 101, and is formed every cell 101 (one detecting circuit 10 is formed on one cell 101). Each of the detecting circuits 10 is a circuit (RLC circuit) formed by connecting a resistor, a coil and a capacitor in series.

Concretely, the first detecting circuit 10 (S1) is the RLC circuit including a resistor Rth1, a coil L1 and a capacitor C1. Similarly, the second detecting circuit 10 (S2) is the RLC circuit including a resistor Rth2, a coil L2 and a capacitor C2, and the third detecting circuit 10 (S3) is the RLC circuit including a resistor Rth3, a coil L3 and a capacitor C3, and the fourth detecting circuit 10 (S4) is the RLC circuit including a resistor Rth4, a coil L4 and a capacitor C4, and the fifth detecting circuit 10 (S5) is the RLC circuit including a resistor Rth5, a coil L5 and a capacitor C5, and the sixth detecting circuit 10 (S6) is the RLC circuit including a resistor Rth6, a coil L6 and a capacitor C6.

The resistors Rth1 to Rth6 are disposed so as to make thermal contact with the corresponding cells 101 (in other words, so that heat of the cell 101 can be transferred to the corresponding resistor). Each of the resistors Rth1 to Rth6 is a temperature-sensitive resistor whose electrical characteristic changes in response to a temperature. As the resistors Rth1 to Rth6, for example, a thermistor can be used.

In each of the detecting circuits 10, inductances of the coils L1 to L6 and capacitances of the capacitors C1 to C6 are set so that resonance frequencies (natural frequencies) of the detecting circuits 10 respectively become different values.

As one example, as shown in FIG. 3, all the inductances L of the coils L1 to L6 are set at 47 µH in the embodiment (temperature detecting apparatus 1). The capacitances C of the capacitors C1 to C6 are set at 0.1 µF, 0.15 µF, 0.22 µF, 0.33 µF, 0.47 µF and 0.56 µF, respectively. The resonance frequencies f0 of the detecting circuits 10 are 73.4 kHz, 59.9 kHz, 49.5 kHz, 40.4 kHz, 33.9 kHz and 31.0 kHz.

The pair of the detection lines 15 electrically connects the six detecting circuits 10 in parallel. A first detection line 15a of the pair of the detection lines 15 is connected to the sides of the resistors Rth1 to Rth6 of each of the detecting circuits 10, and a second detection line 15b is connected to the sides of the capacitors C1 to C6 of each of the detecting circuits 10. A power source 30 for applying a power source voltage Vcc is connected between the first detection line 15a and the second detection line 15b. In addition, the second detection line 15b is connected to the ground.

The detecting processor 20 includes a voltage-dividing resistor 21, a voltage sensor 22, a processing part 23, and the power source 30.

The voltage-dividing resistor 21 is connected to the first detection line 15a. A voltage (in other words, a sine-wave detection signal described below) outputted from the power source 30 is applied to the voltage-dividing resistor 21 and the plurality of the detecting circuits 10 through the detection lines 15. That is, the voltage of the power source 30 is divided into the voltage-dividing resistor 21 and the plurality of the detecting circuits 10. Hereinafter, a resistance value of the voltage-dividing resistor 21 is set at "r".

The voltage sensor 22 is a sensor for detecting a voltage applied to the voltage-dividing resistor 21.

The processing part 23 detects a temperature of each of the cells 101. As the processing part 23, a microcomputer mainly including a CPU, ROM, RAM and an I/O interface can be used. The processing part 23 can, for example, supply the sine-wave detection signal having a specific frequency to the pair of the detection lines 15 through the voltage-dividing resistor 21, and detect the voltage applied to the voltage-dividing resistor 21.

The power source 30 is an AC power source with a variable frequency, and is controlled by the processing part 23 and outputs the sine-wave detection signal (AC voltage) having the specific frequency. The power source 30 can be constructed of, for example, an inverter circuit. However, the power source 30 is not limited to this inverter circuit.

The principle of temperature detection in the temperature detecting apparatus 1 will hereinafter be described.

When a frequency of the sine-wave detection signal inputted to the pair of the detection lines 15 matches with the resonance frequency f0 of any (for example, the detecting circuit S1) of the detecting circuits S1 to S6, its detecting circuit (for example, the detecting circuit S1) changes to a resonance state. In the detecting circuit 10 (S1) in the resonance state, potentials of the capacitors C1 to C6 and the coils L1 to L6 cancel out, with the result that a synthetic impedance of the coils and the capacitors can be regarded as 0Ω. In other words, a current flowing through the detecting circuit (S1) having the resonance frequency matching with the frequency of the sine-wave detection signal becomes a maximum value, and currents flowing through the other detecting circuits (S2 to S6) become relatively small (can be regarded as substantially zero when a difference between the resonance frequencies is sufficiently big).

In this case, an impedance of all the circuits can be grasped as the sum of the resistance value r of the voltage-dividing resistor 21 and a resistance value R of the resistor (Rth1) of the detecting circuit 10 in the resonance state. As a result, when a voltage Vr in the voltage-dividing resistor 21 is detected by the voltage sensor 22, the resistance value R of the resistor (Rth1) of the detecting circuit 10 (S1) in the resonance state can be obtained based on the detected voltage Vr, the input voltage (power source voltage Vcc) and the resistance value r of the voltage-dividing resistor 21.

Further, since the resistors Rth1 to Rth6 of the detecting circuits 10 have temperature-sensitive characteristics, a temperature of the cell 101 provided with the resistor (the detecting circuit S1) can be determined based on the resistance value R. That is, since the resistors Rth1 to Rth6 of the detecting circuits 10 make thermal contact with the cells 101, the determined temperature represents the temperature of the cell 101.

Figure 4:
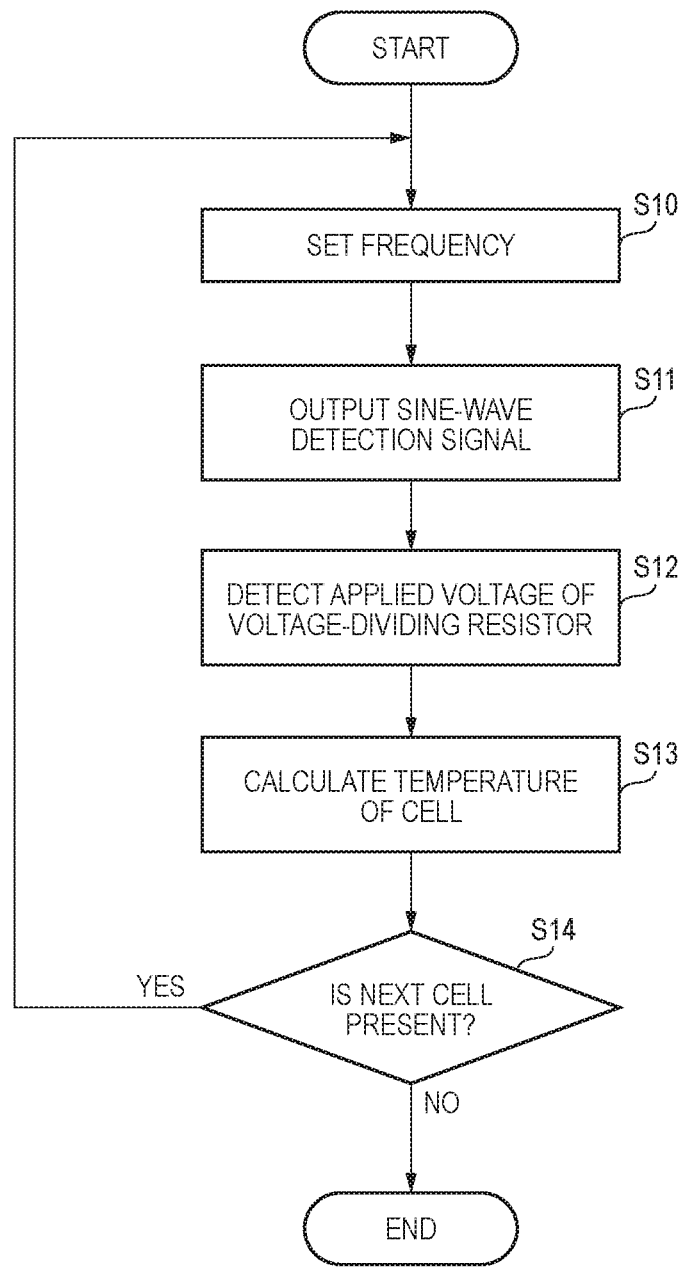
FIG. 4 is a flowchart showing temperature detection processing by the temperature detecting apparatus according to the embodiment of the invention.

A procedure of temperature detection processing in the temperature detecting apparatus 1 will hereinafter be described with reference to FIG. 4. The processing shown by a flowchart of FIG. 4 is called with a predetermined period, and is executed by the processing part 23.

For example, when the processing part 23 starts the processing at predetermined timing, the processing part 23 sets a frequency of a sine-wave detection signal in step 10 (S10). In the present temperature detection processing, the processing part 23 inputs the sine-wave detection signal to the pair of the detection lines 15 while varying the frequency of the sine-wave detection signal so as to correspond to the resonance frequency of each of the plurality of the detecting circuits 10. In the present step, the processing part 23 selects the resonance frequency f0 of the detecting circuit (one of S1 to S6) corresponding to the cell 101 for detecting the temperature from among the six detecting circuits S1 to S6, and sets this resonance frequency as the frequency of the sine-wave detection signal.

Next, in step 11 (S11), the processing part 23 controls the power source 30, and outputs the sine-wave detection signal of the frequency set in step 10. The outputted sine-wave detection signal is inputted to the voltage-dividing resistor 21 and the pair of the detection lines 15.

Then, in step 12 (S12), the processing part 23 detects a voltage in the voltage-dividing resistor 21 by the voltage sensor 22.

Then, in step 13 (S13), the processing part 23 calculates a temperature of the cell 101 provided with the detecting circuit 10 corresponding to the frequency (resonance frequency f0) set in step 10. Concretely, the processing part 23 computes a resistance value R of the resistor Rth1 to Rth6 of its detecting circuit 10 based on the voltage of the voltage-dividing resistor 21. Then, the processing part 23 computes the temperature of the cell 101 based on the computed resistance value R. Accordingly, the temperature of the cell 101 corresponding to the detecting circuit (one of S1 to S6) selected in step 10 (S10) is detected.

Then, in step 14 (S14), the processing part 23 determines whether or not the next cell 101 to detect a temperature is present. When the next cell 101 is absent, the processing part 23 makes a determination of "No" in step 14, and the present routine is ended once. On the other hand, when the next cell 101 is present, the processing part 23 makes a determination of "Yes" in step 14, and returns to step 10. Then, the processing part 23 selects a new cell 101 whose temperature is not detected yet among the six cells 101 in step 10. The processing part 23 selects the resonance frequency f0 of the detecting circuit (one of S1 to S6) corresponding to the selected cell 101, and detects a temperature of its cell 101 using this resonance frequency f0 as the frequency of the sine-wave detection signal. The processing part 23 repeats the above processing until the temperatures of all the cells 101 targeted for temperature detection are detected.

According to the temperature detecting apparatus 1 of the embodiment as described above, the six detecting circuits 10 are formed so as to correspond to the six cells 101, with the result that a temperature state of each of the cells 101 can be detected. Further, all the detecting circuits 10 share the pair of the detection lines 15 and thereby, it is unnecessary to form the pair of the detection lines 15 every detecting circuit 10. Accordingly, the temperature detecting apparatus 1 with good cabling workability of the detection lines 15 while detecting the temperature state of the assembled battery 100 with high resolution can be provided.

Here, the features of the embodiment of the temperature detecting apparatus according to the invention described above will be briefly summarized and listed in the following (1) to (6).

(1) A temperature detecting apparatus (1) which detects a temperature of an assembled battery (100) in which a plurality of cells (101) are assembled, the temperature detecting apparatus comprising:

a plurality of detecting circuits (S1 to S6) which respectively correspond to the plurality of cells, a pair of detection lines (15a, 15b) which electrically connects the plurality of the detecting circuits in parallel, and a processing part (23) which inputs a sine-wave detection signal to the pair of the detection lines through a voltage-dividing resistor so as to detect a temperature of each of the plurality of the cells (21), wherein each of the plurality of the detecting circuits (S1 to S6) includes a circuit in which a temperature-sensitive resistor (Rth1 etc.) whose electrical characteristic changes responding to a temperature, a coil (L1 etc.) and a capacitor (C1 etc.) are connected in series.

(2) The temperature detecting apparatus according to the above (1), wherein an inductance of the coil (L1 etc.) and a capacitance of the capacitor (C1 etc.) in each of the plurality of the detecting circuits (S1 to S6) are set so that a resonance frequency (f0) of each of the plurality of the detecting circuits is a different value from each other, and wherein the processing part (23) inputs the sine-wave detection signal to the pair of the detection lines (15a, 15b) on varying a frequency of the sine-wave detection signal so as to correspond to the resonance frequency of each of the plurality of the detecting circuits.

(3) The temperature detecting apparatus according to the above (2), wherein the processing part (23) calculates a resistance value of the temperature-sensitive resistor (Rth1 etc.) in each of the detecting circuits (S1 to S6) in which the frequency of the sine-wave detection signal corresponds to the resonance frequency (f0), based on a voltage applied to the voltage-dividing resistor (21), and wherein the processing part (23) detects the temperature of each of the plurality of the cells (101) respectively provided with the plurality of the detecting circuits (S1 to S6) corresponding to the resonance frequencies, based on the resistance value of the temperature-sensitive resistor (Rth1 etc.).

(4) The temperature detecting apparatus according to the above (1) or (2), wherein the temperature-sensitive resistor (Rth1 etc.) is a thermistor.

(5) The temperature detecting apparatus according to the above (2), wherein in each of the plurality of the detecting circuits, the inductance of the coil (L1 etc.) is set to be a common value and the capacitance (C1 etc.) of the capacitor is set to be a different value so that the resonance frequency of each of the plurality of the detecting circuits (S1 to S6) is a different value from each other.

(6) The temperature detecting apparatus according to the above (2), wherein in each of the plurality of the detecting circuits (S1 to S6), the capacitance of the capacitor (C1 etc.) is set to be a common value and the inductance of the coil (L1 etc.) is set to be a different value so that a resonance frequency of each of the plurality of the detecting circuits (S1 to S6) is a different value from each other.

The invention has been described in detail with reference to the specific embodiment, but it is apparent to those skilled in the art that various changes or modifications can be made without departing from the spirit and scope of the invention.

For example, in the embodiment described above, the number of cells constructing the assembled battery 100 is set at six, but the number of cells is not particularly limited to this. Further, in the embodiment described above, all the cells 101 constructing the assembled battery 100 are targeted for temperature detection and the detecting circuits S1 to S6 are respectively formed so as to correspond to the cells 101, but only a part of the cells 101 selected from among the assembled battery 100 may be targeted for temperature detection.

Further, the temperature detecting apparatus of the invention can be applied to, for example, batteries mounted in an electrical appliance and a mobile telephone in addition to the battery of the vehicle.

INDUSTRIAL APPLICABILITY

The invention can increase cabling workability of a detection line while detecting a temperature state of an assembled battery with high resolution. The invention having this effect is useful for a temperature detecting apparatus for detecting the temperature state of the assembled battery.

DESCRIPTION OF REFERENCE NUMERALS AND SIGNS

1 TEMPERATURE DETECTING APPARATUS
10 DETECTING CIRCUIT
Rth1~Rth6 RESISTOR
L1~L6 COIL
C1~C6 CAPACITOR
15a, 15b PAIR OF DETECTION LINES
21 VOLTAGE-DIVIDING RESISTOR
23 PROCESSING PART

What is claimed is:

1. A temperature detecting apparatus which detects a temperature of an assembled battery in which a plurality of cells are assembled, the temperature detecting apparatus comprising:
   a plurality of detecting circuits which respectively correspond to the plurality of the cells,
   a pair of detection lines which electrically connects the plurality of the detecting circuits in parallel, and
   a processing part which outputs a sine-wave detection signal to the pair of the detection lines through a voltage-dividing resistor so as to detect a temperature of each of the plurality of the cells,
   wherein each of the plurality of the detecting circuits includes a circuit in which a temperature-sensitive resistor whose electrical characteristic changes responding to a temperature, a coil and a capacitor are connected in series.

2. The temperature detecting apparatus according to claim 1,
   wherein an inductance of the coil and a capacitance of the capacitor in each of the plurality of the detecting circuits are set so that a resonance frequency of each of the plurality of the detecting circuits is a different value from each other, and
   wherein the processing part outputs the sine-wave detection signal to the pair of the detection lines on varying a frequency of the sine-wave detection signal so as to correspond to the resonance frequency of each of the plurality of the detecting circuits.

3. The temperature detecting apparatus according to claim 2,
   wherein the processing part calculates a resistance value of the temperature-sensitive resistor in each of the detecting circuits in which the frequency of the sine-wave detection signal corresponds to the resonance frequency, based on a voltage applied to the voltage-dividing resistor, and wherein the processing part detects the temperature of each of the plurality of the cells provided with the plurality of the detecting circuits, based on the resistance value of the temperature-sensitive resistor.

4. The temperature detecting apparatus according to claim 1,
wherein the temperature-sensitive resistor is a thermistor.

5. The temperature detecting apparatus according to claim 2,
wherein the temperature-sensitive resistor is a thermistor.

6. The temperature detecting apparatus according to claim 2,
wherein in each of the plurality of the detecting circuits, the inductance of the coil is set to be a common value and the capacitance of the capacitor is set to be a different value so that the resonance frequency of each of the plurality of the detecting circuits is a different value from each other.

7. The temperature detecting apparatus according to claim 2,
wherein in each of the plurality of the detecting circuits, the capacitance of the capacitor is set to be a common value and the inductance of the coil is set to be a different value so that a resonance frequency of each of the plurality of the detecting circuits is a different value from each other.

* * * * *